(12) United States Patent
Jing et al.

(10) Patent No.: US 7,745,545 B2
(45) Date of Patent: Jun. 29, 2010

(54) BONDING COMPOSITIONS

(75) Inventors: Naiyong Jing, Woodbury, MN (US); George Van Dyke Tiers, St. Paul, MN (US); Mark W. Muggli, West St. Paul, MN (US); Kathryn M. Spurgeon, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/854,233

(22) Filed: Sep. 12, 2007

(65) Prior Publication Data
US 2008/0064825 A1  Mar. 13, 2008

Related U.S. Application Data

(60) Division of application No. 11/118,190, filed on Apr. 29, 2005, now abandoned, which is a continuation-in-part of application No. 10/903,832, filed on Jul. 30, 2004, which is a continuation-in-part of application No. 10/826,182, filed on Apr. 16, 2004, now abandoned, which is a division of application No. 09/862,124, filed on May 21, 2001, now Pat. No. 6,753,087.

(51) Int. Cl.
C08G 77/445 (2006.01)
C08G 77/448 (2006.01)

(52) U.S. Cl. .................. 525/342; 525/418; 525/452; 525/534; 525/540

(58) Field of Classification Search .................. 525/342, 525/418, 452, 534, 540
See application file for complete search history.

(56) References Cited

U.S. PATENT DOCUMENTS

| | | | |
|---|---|---|---|
| 2,789,063 | A | 4/1957 | Purvis et al. |
| 3,306,800 | A | 2/1967 | Plueddemann |
| 3,558,345 | A | 1/1971 | Baum et al. |
| 3,563,871 | A | 2/1971 | Newman et al. |
| 3,787,281 | A | 1/1974 | Effenberger |
| 4,112,139 | A | 9/1978 | Shirk et al. |
| 4,164,463 | A | 8/1979 | Fang |
| 4,186,084 | A | 1/1980 | Fang |
| 4,233,421 | A | 11/1980 | Worm |
| 4,261,800 | A | 4/1981 | Beckenbaugh et al. |
| 4,338,237 | A | 7/1982 | Sulzbach et al. |
| 4,613,653 | A | 9/1986 | Kitchens et al. |
| 4,775,449 | A | 10/1988 | Dumas et al. |
| 4,780,358 | A | 10/1988 | Ito et al. |
| 4,824,692 | A | 4/1989 | Gillick et al. |
| 4,912,171 | A | 3/1990 | Grootaert et al. |
| 5,051,312 | A | 9/1991 | Allmer |
| 5,086,123 | A | 2/1992 | Guenthner et al. |
| 5,112,692 | A | 5/1992 | Strassel et al. |
| 5,217,837 | A | 6/1993 | Henry et al. |
| 5,262,490 | A | 11/1993 | Kolb et al. |
| 5,284,611 | A | 2/1994 | Grootaert et al. |
| 5,285,002 | A | 2/1994 | Grootaert |
| 5,320,789 | A | 6/1994 | Nishii et al. |
| 5,389,728 | A | 2/1995 | Prejean |
| 5,419,968 | A | 5/1995 | Okada et al. |
| 5,470,617 | A | 11/1995 | Nishii et al. |
| 5,478,652 | A | 12/1995 | Grootaert et al. |
| 5,580,616 | A | 12/1996 | Niino et al. |
| 5,656,121 | A | 8/1997 | Fukushi |
| 5,658,671 | A | 8/1997 | Fukushi |
| 5,734,085 | A | 3/1998 | Coggio et al. |
| 5,804,616 | A | 9/1998 | Mowrer et al. |
| 5,859,086 | A | 1/1999 | Freund et al. |
| 5,882,466 | A | 3/1999 | Grootaert et al. |
| 6,117,497 | A | 9/2000 | Murahara et al. |
| 6,255,384 | B1 | 7/2001 | McCarthy et al. |
| 6,479,158 | B1 | 11/2002 | Kuntz et al. |
| 6,630,047 | B2 | 10/2003 | Jing et al. |
| 6,685,793 | B2 | 2/2004 | Jing |
| 6,759,129 | B2 | 7/2004 | Fukushi |
| 7,323,514 | B2 * | 1/2008 | Jing et al. .............. 525/102 |

FOREIGN PATENT DOCUMENTS

| | | | |
|---|---|---|---|
| EP | 0 228 365 | | 7/1987 |
| EP | 0 670 868 | | 1/1997 |
| EP | 0670868 | * | 1/1997 |
| EP | 0 760 385 | | 3/1997 |

(Continued)

OTHER PUBLICATIONS

Allmer, K. and Feiring, A.E., "Photochemical Modification of a Fluoropolymer Surface," *Macromolecules*, vol. 24, (1991) p. 5487-5488.

(Continued)

*Primary Examiner*—Robert D. Harlan
(74) *Attorney, Agent, or Firm*—Colene H. Blank

(57) ABSTRACT

Polymer bonding compositions having greater than about 1 milliequivalent primary amine/100 grams of the polymer, more preferably greater than about 3 milliequivalent non-tertiary amine/100 grams of the polymer. Preferably the polymer is not significantly crosslinked. These bonding compositions may be especially useful for bonding fluropolymers. Processes for making the novel polymers and the resulting multilayer bonded articles are described. The polymers include polymer-bonded $ZNHLSi(OP)_a(X)_{3-a-b}(Y)_b$ units. The bonding composition may be used for making multilayer polymer laminates such as tubes and films and containers.

1 Claim, No Drawings

FOREIGN PATENT DOCUMENTS

| | | | |
|---|---|---|---|
| EP | 0760385 | * | 3/1997 |
| EP | 0 867 785 A2 | | 9/1998 |
| JP | 61-255853 | | 11/1986 |
| JP | 03-093874 | | 4/1991 |
| JP | 06-279590 | | 10/1994 |
| JP | 7-96575 | | 4/1995 |
| JP | 07-179628 | | 7/1995 |
| JP | 07-179636 | | 7/1995 |
| JP | 09-193164 | | 7/1997 |
| JP | 2000-256488 | | 9/2000 |
| WO | WO 88/05449 | | 7/1988 |
| WO | WO 96/05965 A1 | | 2/1996 |
| WO | WO 98/06775 | | 2/1998 |
| WO | WO 00/49103 | | 8/2000 |
| WO | WO 02/094911 | | 11/2002 |

OTHER PUBLICATIONS

Brewis, D. M. "Surface Analysis and Pretreatment of Plastics and Metals," Applied Science Publishers, New York, 1982, p. 1-11.

Burdeniuc, J. et al., "New Reaction of Saturated Fluorocarbons: Partial Reduction by $NH_3$ with Hg Photosensitization," *Journal Am. Chem. Soc.*, vol. 117, (1995), p. 10119-10120.

Burdeniuc, J. et al., "Mineralization of Chlorofluorocarbons and Aromatization of Saturated Fluorocarbons by a Convenient Thermal Process," *Science*, vol. 271, Jan. 19, 1996, p. 340-341.

Burggraaf, Pieter, "Pick your Plastic Pipe Carefully," *Semiconductor International*, Jul. 1988, p. 54-58.

Clark, D.T. and Hutton, D.R., "Surface Modification by Plasma Techniques. I. The Interactions of a Hydrogen Plasma with Fluoropolymer Surfaces," *Journal of Polym. Sci., Polym. Chem. Ed.*, vol. 25, (1987) p. 2643-2664.

Collins, W.T., *Handbook of Coating Additives*: Chapter 10: "Adhesion Promoters," Ed. Leonard J. Calbo, (1987) p. 281-294.

Cooper, D.L. et al., "Theoretical Studies of Fluorocarbons Part III. Primary, Secondary, Tertiary and Quaternary Centres," *Journal of Fluorine Chemistry*, vol. 49, (1990), p. 421-432.

Costello, C.A. and McCarthy, T.J., "Surface Modification of Poly(tetrafluoroethylene) with Benzoin Dianion," *Macromolecules*, vol. 17, (1984) p. 2940-2942.

Database WPI, Week 8411, Derwent Publications, Ltd., London, GB: AN 1984-066964, XP002209025 & Research Disclosure4, NR. 238006, Kenneth Mason Publications, vol. 238, No. 006, 1984, Hampshire, UK.

Iqbal, Z. et al., "Polyacetylene Formed by the Benzoin Dianion Reduction of Poly(tetrafluoroethylene)," *Macromolecules*, vol. 19, (1986) p. 2992-2996.

Kaprinidis, N.A. and Turro, N.J., "Photosensitized Defluorination of Saturated Perfluorocarbons," *Tetrahedron Letters*, vol. 37, No. 14, (1996) p. 2373-2376.

Kiplinger, J.L. et al., "Structure and Structure Elucidation of the Naturally Occurring Dodecahydroporphyrin Factor F 430 (150)," *Chemical Reviews*, vol. 94, (1994) p. 341.

Kuper, S. et al., "Ablation of Polytetrafluoroethylene (Teflon) with Femtosecond UV Excimer Laser Pulses," *Applied Physics Letters*, vol. 54, No. 1, Jan. 2, 1989, p. 4-6.

Layer R.W., "The Chemistry of Imines," *Chemical Review*, vol. 63, (1963) p. 489-510.

MacNicol, D.D. and Robertson, C.D., "New and Unexpected Reactivity of Saturated Fluorocarbons," *Nature* vol. 332, Mar. 3, 1988, p. 59-61.

Marsella, J.A. et al., Selective Reduction of Saturated Perfluorocarbons, *Journal Organic Chemistry*, vol. 57, (1992) p. 2856-2860.

Niino, H. et al., "Surface Modification and Metallization of Fluorocarbon Polymers by Excimer Laser Processing," *Applied Physics Letters*, vol. 63, No. 25, Dec. 20, 1993, p. 3527-3529.

Okada, Atsushi, et al., "Endowment With The Wettability On The Surface of Tetrafluoroethylene-Perfluoroalkyl Vinyl Ether Copolymer By Excimer Laser Irradiation" *Chemistry Letters*, (1993) p. 1637-1638.

"Plastics-Determination of Matter Extractable by Organic Solvents (Conventional Methods)", *International Standard*, ISO 6427:1992(E), Second Edition, Dec. 15, 1992, p. 1-9.

Plueddemann, E.P.; *Silane Coupling Agents*, Chapter 7: Particulate-Filled Composites, 7.5 "Coupling and Adhesion," Plenum Press, NY, 1982, p. 188-205.

Plueddemann, E.P., *Silane Coupling Agents*, Second Edition, Chapter 4: Surface Chemistry, 4.6 "Chemical Reactions at the Interface," Plenum Press, NY, Jan. 1991, p. 101-113.

Revesz, K. et al., "Excimer Laser Induced Surface Chemical Modification of Polytetrafluoroethylene," *Applied Surface Science* vol. 109/110 (1997) p. 222-226.

Rye, R.R. and Arnold, G.W., "Depth Dependence of Alkali Etching of Poly(tetrafluoroethylene): Effect of X-ray Radiation," *Langmuir*, vol. 5, (1989) p. 1331-1334.

Rzaev, Z.M.O., et al., "Reactions of Some Anhydride-containing Copolymers with γ-aminopropyltriethoxysilane," *Polymer*, vol. 42 (2001) p. 5599-5606.

Siperko, L.M. and Thomas, R.R., "Chemical and Physical Modification of Fluoropolymer Surfaces for Adhesion Enhancement: A Review," *Journal of Adhesion Science Technology*, vol. 3, No. 3, (1989) p. 157-173.

Sprung, M.M., "A Summary of the Reactions of Aldehydes With Amines," *Chemical Review*, vol. 26, (1940) p. 297-338.

"Standard Test Methods for Determination of Gel Content and Swell Ratio of Crosslinked Ethylene Plastics," ASTM D2765-01, Jun. 10, 2001, p. 119-125.

Weismann, S.I., "Paramagnetic Resonance Spectra of Wurster's Free Radical Ions," *Journal Phys. Chem.*, vol. 22, (1954) p. 1135-1136.

Yao, T. et al., "Anodic Voltammetry and ESR Studies of P-Phenylenediamine and Some of Its Derivatives in Acetonitrile," *Chemistr .Letters*, (1974), p. 939-944.

* cited by examiner

BONDING COMPOSITIONS

CROSS-REFERENCE TO RELATED APPLICATION(S)

This application is a divisional of pending U.S. application Ser. No. 11/118,190, filed on Apr. 29, 2005 now abandoned, which is a continuation-in-part of U.S. application Ser. No. 10/903,832, filed Jul. 30, 2004, now pending, which is a continuation-in-part of U.S. application Ser. No. 10/826,182, filed Apr. 16, 2004 now abandoned, now pending, which was a divisional of U.S. application Ser. No. 09/862,124, filed May 21, 2001, issued as U.S. Pat. No. 6,753,087, the disclosures of which are herein incorporated by reference.

TECHNICAL FIELD

This present invention relates to bonding compositions and methods of making. The bonding compositions may be especially useful for bonding fluoropolymers to various polymers.

BACKGROUND

Fluorine-containing polymers (also known as "fluoropolymers") are a commercially useful class of materials. Fluoropolymers include, for example, crosslinked fluoroelastomers and semi-crystalline or glassy fluoropolymers. Fluoropolymers are generally of high thermal stability and are particularly useful at high temperatures. They may also exhibit extreme toughness and flexibility at very low temperatures. Many of these fluoropolymers are almost totally insoluble in a wide variety of solvents and are generally chemically resistant. Some have extremely low dielectric loss and high dielectric strength, and may have unique non-adhesive and low friction properties. Fluoroelastomers, particularly the copolymers of vinylidene fluoride with other ethylenically unsaturated halogenated monomers such as hexafluoropropylene, have particular utility in high temperature applications such as seals, gaskets, and linings.

Multi-layer constructions containing a fluoropolymer enjoy wide industrial application. Such constructions find utility, for example, in fuel line hoses and related containers and hoses or gaskets in the chemical processing field. Adhesion between the layers of a multi-layered article may need to meet various performance standards dependent on the use of the finished article. However, it is often difficult to establish high bond strengths when one of the layers is a fluoropolymer, in part because of the non-adhesive qualities of fluoropolymers. Various methods have been proposed to address this problem. One approach is to use an adhesion promoter between the fluoropolymer layer and the second polymer layer. Amines and aminosilanes have been used as adhesion promoters. Surface treatments for the fluoropolymer layer, including the use of powerful reducing agents (e.g., sodium naphthalide) and corona discharge, have also been employed to enhance adhesion. In the case of fluoropolymers containing interpolymerized units derived from vinylidene fluoride, exposure of the fluoropolymer to a dehydrofluorinating agent such as a base has been used.

There is a need for improved amino functional polymeric bonding compositions that can be created from conventional readily available commercial non-fluoropolymers by a simple and economical reaction while retaining the valuable properties of the starting polymers, yet also allow bonding to difficult-to-bond substrates such as THV, PVDF and ETFE fluoropolymers. It is well known that the Si—N or Si—S bonds are weaker than the Si—O bond. Therefore Si is bonded predominantly to oxygen rather than nitrogen in the inventive polymers.

SUMMARY

The present inventors have discovered the novel polymers described and claimed herein, a process for creating them, and the resulting multilayer bonded articles.

In one aspect the present invention provides a bonding composition. The bonding composition comprises a polymer comprising greater than about 3 milliequivalent non-tertiary amine per100 grams of the polymer;
  wherein the polymer comprises a plurality of internalized polymer-bonded $ZNHLSi(OP)_a(X)_{3-a-b}(Y)_b$ units;
  wherein Z is hydrogen, alkyl, or substituted alkyl including amino-substituted alkyl;
  wherein L is a divalent alkylene or substituted alkylene linking group and L may be interrupted by one or more divalent aromatic groups or heteroatomic groups wherein P represents one or more polymer chains;
  wherein a is 1 to 3;
  wherein a+b=1 to 3;
  wherein each X is a hydrolytically stable group;
  wherein each Y is a labile group; and
  wherein X or Y, when multiple, may be independently chosen.

In another aspect the present invention provides a bonding composition comprising a polymer comprising greater than about 1 milliequivalent internalized primary amine per100 grams of the polymer;
  wherein the polymer comprises a plurality of internalized polymer-bonded $ZNHLSi(OP)_a(X)_{3-a-b}(Y)_b$ units;
  wherein Z is hydrogen, alkyl, or substituted alkyl including amino-substituted alkyl;
  wherein L is a divalent alkylene or substituted alkylene linking group and L may be interrupted by one or more divalent aromatic groups or heteroatomic groups;
  wherein P represents one or more polymer chains;
  wherein a is 1 to 3;
  wherein a+b=1 to 3;
  wherein each X is a hydrolytically stable group;
  wherein each Y is a labile group; and
  wherein X or Y, when multiple, may be independently chosen.

Alkyls and alkylenes include substituted alkyls such that the substitution does not interfere with the desired outcome.

In another aspect the present invention provides a bonding composition comprising a polymer comprising greater than about 1 milliequivalent internalized non-tertiary amine per 100 grams of the polymer;
  wherein the gel content is less than about 10% by weight;
  wherein the polymer comprises a plurality of internalized polymer-bonded $ZNHLSi(OP)_a(X)_{3-a-b}(Y)_b$ units;
  wherein Z is hydrogen, alkyl, or substituted alkyl including amino-substituted alkyl;
  wherein L is a divalent alkylene or substituted alkylene linking group and L may be interrupted by one or more divalent aromatic groups or heteroatomic groups;
  wherein P represents one or more polymer chains;
  wherein a is 1 to 3;
  wherein a+b=1 to 3;
  wherein each X is a hydrolytically stable group;
  wherein each Y is a labile group; and
  wherein X or Y, when multiple, may be independently chosen. In another aspect the present invention features processes for making a multilayer bonded article comprising co-extruding or laminating the inventive bonding composition layer with a fluoropolymer layer.

In another aspect the bonding composition comprises the reaction product of an amino substituted organosilane ester or ester equivalent and a polymer that has a plurality of polar functionalities combinatively reactive with the silane ester or ester equivalent. By combinatively reactive is meant that a group on the polymer reacts to displace the ester or ester equivalent groups. The resulting polymer is covalently bonded to the silane via the silicon atom. In a related aspect the bonding composition comprises the reaction product of an amino substituted organosilane ester or ester equivalent and a polyamide or a thermoplastic polyurethane wherein the reaction product has internalized Si—O—Si and NHR groups. In still another related aspect the bonding composition comprises the reaction product of an amino substituted organosilane ester or ester equivalent and a polymer with anhydride functionality wherein the amount of aminosilane is sufficient to prevent significant crosslinking and wherein the reaction product has internalized Si—O—Si and NHR groups.

In another aspect the present invention features a process for making these bonding compositions comprising extruding a mixture of an amino substituted organosilane ester or ester equivalent and a polymer that has a plurality of polar functionalities combinatively reactive with the silane ester or ester equivalent to displace the ester or ester equivalent groups and wherein the polymer is covalently bonded to the silane via a silicon atom.

In another aspect the present invention features the multi-layer bonded articles comprising the bonding compositions of the present invention. By way of example the multilayer bonded articles may include films, tubes and containers.

Examples of polar functionalities include —OH, —Si(OH)$_3$, —Si(OR)$_3$, —O(C═O)R, —O(C═O)OR, —O(C═O)NHR where R may be alkyl, arylalkyl or aryl, and may contain O, S or N heteroatoms or combinations of these heteroatoms. These polar functionalities preferably do not react with or form salts with the amine of the amino-substituted organosilane ester or ester equivalent. Thus, for example, preferably a polar functionality should not be a carboxylic acid or sulfonamide as the amine of the amino-substituted organosilane ester or ester equivalent may react with these functionalities to severely lower the bonding reactivity of the amine. The bonding composition is made by intimately mixing the silane and polymer, optionally at elevated temperature, in order to react the two materials. As a first action, a modified polymer may result, which may subsequently bond to further aminosilane via siloxane linkages. This admixture and pre-reaction is believed to afford a more effective attachment of an aminosilane to a substrate than can be achieved by simple coating of aminosilane to a substrate. The free amine of these new polymers is intended to be useful in creating bonding between the bonding composition and a substrate or substrates. As can be seen in Table 1, mixer torques and temperatures may increase when the aforementioned combinative reaction occurs (examples 1-8), while in the absence of an organosilane ester or ester equivalent no mixer torque increase occurs, or even a decrease occurs (comparative examples A-D which have amine functionality but no siloxane functionality). Examples 2 and 5 are not examples of aminosilanes useful for this invention as they do not contain amine, yet they do show an increase in torque, indicating a reaction of the silane ester or ester equivalent with the polymer, unlike the case with comparative examples A-D which have no silane ester or ester equivalent. Example 7 which has only tertiary amine (not primary or secondary amine useful for bonding) is also not an aminosilane useful in this invention, yet it again does show a torque increase because of the reaction of the silane ester or ester equivalent and polymer. However, a torque increase is not a necessity to indicate the formation of the new polymers. For example, the use of an M-type silane ester or ester equivalent structure bearing non-tertiary amine would form a new polymer of this invention but would not be expected to generate a torque increase. Table 2 shows the improved peel strengths of this invention with various substrates and with various ratios of polymer to silane. Multi-layer structures made from these bonding compositions and substrate(s) may consist of a simple 2 layer structure, for example, the bonding composition itself co-extruded with a fluoropolymer, or they may have 3 or more layers, for example a fluoropolymer/bonding composition/nylon laminate.

Multi-layer structures made using these bonding compositions typically include at least one fluoropolymer substrate although the substrate optionally may be a hydrocarbon polymer or any substrate reactive with the free amine of the reacted bonding composition. The utility of these new polymers results from their ability, under suitable heated contact, to form strong bonds to any of various polymers mentioned above, specifically fluoropolymers wherein a hydrogen atom is adjacent to a fluorine atom.

The amino-substituted organosilane ester or ester equivalent bears on the silicon atom at least one ester or ester equivalent, typically 2 or more typically 3 such groups which may be the same or different. The bonding composition may include a phase active agent. Preferably, the phase active agent may be a phosphonium salt, an ammonium salt, a fluoroaliphatic sulfonyl compound, or an arylcarboxylic acid.

Bonded multi-layer materials may have combined physical and chemical properties possessed by both fluoropolymers and non-fluorinated polymers, resulting in less expensive but nevertheless well-performing and perhaps better-performing articles. For example, the fluoropolymer component may be used in automotive hose and container constructions, protective barrier films, anti-soiling films, low-energy-surface PSA tapes, and coatings for aircraft. The bonding process may include lamination or co-extrusion. The bonding composition may be used to form a composite article having a fluoropolymer layer bonded to a non-fluoropolymer layer in a multi-layer material.

In this application:

"interrupted by one or more divalent aromatic groups or heteroatomic groups" means having at least an alkylene or substituted alkylene group between the aromatic group or heteroatomic group and the nitrogen.

"T-type siloxy structure" means a trioxysilane structure wherein the other silane-attached atom is carbon.

"D-type siloxy structure" means a dioxysilane structure wherein the other silane-attached atoms are carbon.

"M-type siloxy structure" means a monooxysilane structure wherein the other silane-attached atoms are carbon.

"internalized polymer-bonded ZNHLSi(OP)$_a$(X)$_{3-a-b}$(Y)$_b$ units" means molecular units distributed throughout the polymer in a bulk fashion (i.e. not simply a surface distribution) that are covalently bonded to P where P represents one or more polymer chains including aminosilane-modified polymer chains.

"aminosilane-modified polymer chains" means polymer chains that contain the unit ZNHLSi(OP)$_a$(X)$_{3-a-b}$(Y)$_b$ where wherein Z is hydrogen, alkyl, or substituted alkyl including amino-substituted alkyl; wherein L is a divalent alkylene or substituted alkylene linking group and L may be interrupted by one or more divalent aromatic groups or heteroatomic groups;

wherein P represents one or more polymer chains;
wherein a is 1 to 3;
wherein a+b=1 to 3;
wherein each X is a hydrolytically stable group;
wherein each Y is a labile group; and
wherein X or Y, when multiple, may be independently chosen.

"ester equivalent" means groups such as silane amides (RNR'Si), silane alkanoates (RC(O)OSi), Si—O—Si, SiN(R)—Si, SiSR and RCONR'Si that are thermally and/or catalytically displaceable by R"OH. R and R' are independently chosen and can include hydrogen, alkyl, arylalkyl, alkenyl, alkynyl, cycloalkyl, and substituted analogs such as alkoxyalkyl, aminoalkyl, and alkylaminoalkyl. R" may be the same as R and R' except it may not be H.

"not significantly crosslinked" means that the polymer gel content is less than 10% as determined by ASTM D2765-01 Note 2 ("Determination of Gel Content and Swell Ratio of Ethylene Plastics").

"primary amine" means amine reactive (presumably dehydratively) with an appropriately tagged benzaldehyde (e.g. 4-methylthiobenzaldehyde) so that retention of the aldehyde presumably in the form of an imine can be easily detected and measured.

"non-tertiary amine" means the sum of primary and secondary amine.

The details of one or more embodiments of the invention are set forth in the description below. Other features, objects, and advantages of the invention will be apparent from the description and claims.

DETAILED DESCRIPTION

In one aspect the present invention provides polymeric aminosilane bonding compositions which may be employed to bond to other polymers, preferably fluoropolymers, to form laminates of two or more layers.

The bonding composition may be made by reacting an amino-substituted organosilane ester (e.g. alkoxy silane) or ester equivalent and a polymer that has a plurality of polar functionalities combinatively reactive with the silane ester or ester equivalent. The amino-substituted organosilane ester or ester equivalent bears on the silicon atom at least one ester or ester equivalent group, preferably 2, or more preferably 3 groups. Ester equivalents are well known to those skilled in the art and include compounds such as silane amides (RNR'Si), silane alkanoates (RC(O)OSi), Si—O—Si, SiN(R)—Si, SiSR and RCONR'Si. These ester equivalents may also be cyclic such as those derived from ethylene glycol, ethanolamine, ethylenediamine and their amides. R and R' are defined as in the "ester equivalent" definition in the Summary. Another such cyclic example of an ester equivalent is

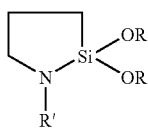

In this cyclic example R' is as defined in the preceding sentence except that it may not be aryl. 3-aminopropyl alkoxysilanes are well known to cyclize on heating and these RNHSi compounds would be useful in this invention. Preferably the amino-substituted organosilane ester or ester equivalent has ester groups such as methoxy that are easily volatilized as methanol so as to avoid leaving residue at the interface which may interfere with bonding. The amino-substituted organosilane must have at least one ester equivalent; for example, it may be a trialkoxysilane. For example, the amino-substituted organosilane may have the formula

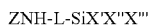

ZNH-L-SiX'X"X'"

where Z is hydrogen, alkyl, or substituted alkyl including amino-substituted alkyl;

where L is a divalent straight chain C1-12 alkylene or may comprise a C3-8 cycloalkylene, 3-8 membered ring heterocycloalkylene, C2-12 alkenylene, C4-8 cycloalkenylene, 3-8 membered ring heterocycloalkenylene or heteroarylene unit. L may be interrupted by one or more divalent aromatic groups or heteroatomic groups. The aromatic group may include a heteroaromatic. The heteroatom is preferably nitrogen, sulfur or oxygen. L is optionally substituted with C1-4 alkyl, C2-4 alkenyl, C2-4 alkynyl, C1-4 alkoxy, amino, C3-6 cycloalkyl, 3-6 membered heterocycloalkyl, monocyclic aryl, 5-6 membered ring heteroaryl, C1-4 alkylcarbonyloxy, C1-4 alkyloxycarbonyl, C1-4 alkylcarbonyl, formyl, C1-4 alkylcarbonylamino, or C1-4 aminocarbonyl. L is further optionally interrupted by —O—, —S—, —N(Rc)—, —N(Rc)—C(O)—, —N(Rc)—C(O)—O—, —O—C(O)—N(Rc)—, —N(Rc)—C(O)—N(Rd)—, —O—C(O)—, —C(O)—O—, or —O—C(O)—O—. Each of Rc and Rd, independently, is hydrogen, alkyl, alkenyl, alkynyl, alkoxyalkyl, aminoalkyl (primary, secondary or tertiary), or haloalkyl; and each of X', X" and X'" is a C1-18 alkyl, halogen, C1-8 alkoxy, C1-8 alkylcarbonyloxy, or amino group, with the proviso that at least one of X', X", and X'" is a labile group. Further, any two or all of X', X" and X'" may be joined through a covalent bond. The amino group may be an alkylamino group. Examples of amino-substituted organosilanes include 3-aminopropyltrimethoxysilane (SILQUEST A-1110), 3-aminopropyltriethoxysilane (SILQUEST A-1100), 3-(2-aminoethyl)aminopropyltrimethoxysilane (SILQUEST A-1120), SILQUEST A-1130, (aminoethylaminomethyl)phenethyltrimethoxysilane, (aminoethylaminomethyl)phenethyltriethoxysilane, N-(2-aminoethyl)-3-aminopropylmethyldimethoxysilane (SILQUEST A-2120), bis-(γ-triethoxysilylpropyl) amine (SILQUEST A-1170), N-(2-aminoethyl)-3-aminopropyltributoxysilane, 6-(aminohexylaminopropyl)trimethoxysilane, 4-aminobutyltrimethoxysilane, 4-aminobutyltriethoxysilane, p-(2-aminoethyl)phenyltrimethoxysilane, 3-aminopropyltris(methoxyethoxyethoxy)silane, 3-aminopropylmethyldiethoxysilane, oligomeric aminosilanes such as DYNASYLAN 1146, 3-(N-methylamino)propyltrimethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 3-aminopropylmethyldiethoxysilane, 3-aminopropylmethyldimethoxysilane, 3-aminopropyldimethylmethoxysilane, 3-aminopropyldimethylethoxysilane,

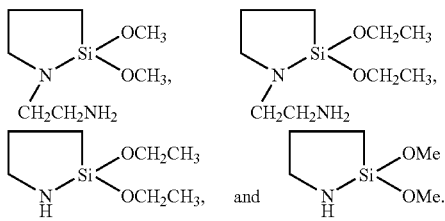

Additional "precursor" compounds such as a bis-silyl urea [RO)$_3$Si(CH$_2$)NR]$_2$C=O are also examples of amino-substituted organosilane ester or ester equivalent that liberate amine by first dissociating thermally. The amount of aminosilane is between 0.01% and 10% by weight relative to the functional polymer, preferably between 0.03% and 3%, and more preferably between 0.1% and 1%. As functional polymers differ, this amount will be chosen to provide the ability for melt-processing such as extrusion while typically maximizing the amine content of the silane-modified polymer, a simple task for one skilled in the art of melt-processing. Since it is preferred to maintain melt processability of the polymer the type of aminosilane ester or ester equivalent may need be adjusted to accommodate this. For example, if a very high molecular weight starting polymer is reacted with an aminosilane ester or ester equivalent with a T-type siloxy structure the resulting polymer may not be melt processable. In this case, one skilled in the art might substitute a D-type or even an M-type siloxy structure for the aminosilane ester or ester equivalent to allow melt processability of the resulting polymer.

The aminosilane preferably includes primary amine as this is expected to be more reactive in bonding applications. Primary amine content may be determined in the bonding composition by an analytical scheme involving reaction of the amine with a benzaldehyde derivative containing a "taggant" atom such as sulfur (e.g. 4-methylthiobenzaldehyde). "Taggant" means having an easily analyzable substituent such as sulfur or bromine, etc. If for example the starting polymer had high levels of sulfur one skilled in the art would use a determinable benzaldehyde such as 4-bromobenzaldehyde. Other sufficiently sensitive tagging procedures, for example, might include fluorine by NMR, radiochemical methods such as carbon-14 or tritium, an attached dye or colored group by visible or UV spectroscopy, or X-ray fluorescence. The total non-tertiary amine content can be measured by using known reactions such as the reaction of appropriately tagged aliphatic or aromatic sulfonyl fluorides as in the presence of tertiary amines to form sulfonamides.

Useful polymers that are used to react with the aminosilanes may have a number average molecular weight greater than 1000, preferably greater than 10,000 and more preferably greater than 100,000. Examples of such useful polymers that have a plurality of polar functionalities include anhydride modified polyethylene polymers commercially available from E.I. DuPont de Nemours & Co., Wilmington, Del., under the trade designation BYNEL co-extrudable adhesive resins; urethane polymers such as MORTHANE L424.167 (MI=9.7), PN-04 or 3429 from Morton International, Seabrook, N.H., and X-4107 from B.F. Goodrich Co., Cleveland, Ohio; ATEVA EVA 1240A, EVA-9 (ATEVA 1070) and EVA-12 (ATEVA 1240), ethylene-vinyl acetate copolymers commercially available from AT Plastics, Brampton, Ontario, Canada; ELVAX 450, an ethylene-vinyl acetate copolymer having 18 wt % vinyl acetate and a Vicat softening temperature of 61° C. commercially available from E.I. DuPont de Nemours of Wilmington Del.; modified polyolefins such as ADMER NF456A (MAPE) commercially available from Mitsui Chemicals America Inc., Purchase, N.Y.; terpolymers of ethylene, butyl acrylate and glycidylmethacrylate such as ELVALOY PTW commercially available from DuPont; EMAC 2202T available from Chevron Chemical Co., Houston, Tex.; AQUATHENE AQ120-000, an ethylene-vinyl trialkoxysilane (2% by weight vinyl trialkoxysilane monomer) copolymer available from Equistar Chemicals LP, (Houston, Tex.). Mixtures of any of these polymers may also be used. The mixtures may be made before or after reaction with the aminosilane.

The bonding composition may also include a phase active agent to facilitate effective bonding by, for example, partially dissolving in the fluoropolymer or the substrate or both. The phase active agent may be an ammonium compound, a phosphonium compound, a sulfonium compound, a sulfoxonium compound, an iodonium compound, a fluoroaliphatic sulfonyl compound, an arylcarboxylic acid, or combinations thereof. Examples include benzyltriphenylphosphonium chloride, benzyltributylammonium chloride, an arylammonium salt, a triarylsulfonium chloride.

The fluoropolymer layer may be a partially fluorinated polymer such as a terpolymer (HTE) of hexafluoropropylene (HFP), tetrafluoroethylene (TFE) and ethylene (E) and may be either melt-processable such as in the case of a terpolymer of tetrafluoroethylene, hexafluoropropylene and vinylidene fluoride (THV), polyvinylidene fluoride (PVDF), a copolymer of tetrafluoroethylene and ethylene (ETFE), and other melt-processable fluoroplastics, or may be non-melt processable such as cured fluoroelastomers. Fluoroelastomers may be processed before they are cured by injection or compression molding or other methods normally associated with thermoplastics. Fluoroelastomers after curing or crosslinking may not be able to be further processed. Fluoroelastomers may be coated out of solvent in their uncrosslinked form. Fluoropolymers may also be coated from an aqueous dispersion. Mixtures of fluoropolymers may also be used. In preferred embodiments, the fluoropolymer may include THV, HTE, ETFE and PVDF.

Preferably, the fluoropolymer is a material that is capable of being extruded or coated as from solution or dispersion. Such fluoropolymers typically are fluoroplastics that have melting temperatures ranging from about 100° C. to about 330° C., more preferably from about 150° C. to about 270° C. Preferred fluoroplastics include interpolymerized units derived from vinylidene difluoride (VDF) and tetrafluoroethylene and may further include interpolymerized units derived from other fluorine-containing monomers, non-fluorine-containing monomers, or a combination thereof. Examples of suitable fluorine-containing monomers include tetrafluoroethylene (TFE), hexafluoropropylene (HFP), chlorotrifluoroethylene (CTFE), 3-chloropentafluoropropene, perfluorinated vinyl ethers (e.g., perfluoroalkoxy vinyl ethers such as $CF_3OCF_2CF_2CF_2OCF=CF_2$ and perfluoroalkyl vinyl ethers such as $CF_3OCF=CF_2$ and $CF_3CF_2CF_2OCF=CF_2$) and vinyl fluoride. Examples of suitable non-fluorine-containing monomers include olefin monomers such as ethylene, propylene, and the like.

VDF-containing fluoroplastics may be prepared using emulsion polymerization techniques as described, e.g., in Sulzbach et al., U.S. Pat. No. 4,338,237 or Grootaert, U.S. Pat. No. 5,285,002. Useful commercially available VDF-containing fluoroplastics include, for example, THV 200, THV 400, THV 500G, THV 610X fluoropolymers (available from Dyneon LLC, St. Paul, Minn.), KYNAR 740 fluoropolymer (available from Atochem North America, Philadelphia, Pa.), HYLAR 700 (available from Ausimont USA, Inc., Morristown, N.J.), and FLUOREL FC-2178 (available from Dyneon LLC).

A particularly useful fluoroplastic includes interpolymerized units derived from at least TFE and VDF in which the amount of VDF is at least 0.1% by weight, but less than 20% by weight. Preferably, the amount of VDF ranges from 3 to 15% by weight, more preferably from 10 to 15% by weight.

Examples of suitable fluoroelastomers include VDF-HFP copolymers, VDF-HFP-TFE terpolymers, TFE-propylene copolymers, and the like.

Other examples of fluoropolymers include THV (a terpolymer of $CF_2=CF_2/CF_3CF=CF_2/CF_2=CH_2$), HTE (a terpolymer of $CF_2=CF_2/CF_3CF=CF_2/CH_2=CH_2$), Dyneon PVDF 11010 (a copolymer of $CF_2=CH_2$ (85wt %)/$CF_3CF=CF_2$ (15wt %)) and Dyneon PVDF 31508 (a copolymer of $CF_2=CH_2$ and $CF_2=CFCl$).

Useful non-fluoropolymer layers that may bond to the bonding compositions of this invention include polyamides, polyurethanes, polyesters, polyimides, polycarbonates, polyureas, polyacrylates, polymethylmethacrylate, or a mixture thereof. For example, the polymer may be a non-fluorinated elastomer, acrylonitrile/butadiene rubber (NBR), chlorinated-and-chlorosulfonated polyethylene, chloroprene rubber, epichlorohydrin (ECO) rubber, blends of polyvinyl chloride and NBR, and ethylene-acrylate copolymer rubber.

Useful polyamides that may be bonded to the bonding composition include the well-known nylons available from a number of sources. Particularly preferred polyamides are nylon-6, nylon-6,6, nylon-11, and nylon-12. In addition, other nylon materials such as nylon-6,12, nylon-6,9, nylon-4, nylon-4,2, nylon-4,6, nylon-7, and nylon-8 may be used, as well as ring-containing polyamides such as nylon-6,T and nylon-6,1. Suitable nylons include VESTAMID L2140, a nylon-12 available from Creanova, Inc. of Somerset, N.J. Polyether-containing polyamides, such as PEBAX polyamides (Atochem North America, Philadelphia, Pa.), may also be used.

Useful polyurethane polymers that may be bonded to the bonding composition include aliphatic, cycloaliphatic, aromatic, and polycyclic polyurethanes. These polyurethanes are typically produced by reaction of a polyfunctional isocyanate with a polyol according to well-known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetramethylene ether glycol, poly(ethylene oxide) glycol, poly(propylene oxide) glycol, polycaprolactone diol, poly-(1,2-butylene oxide) glycol, triols, tetraols, higher polyols and combinations thereof. Chain extenders such as butanediol or hexanediol may also be used in the reaction. Useful commercially available urethane polymers include MORTHANE L424.167 (MI=9.7), PN-04 or 3429 from Morton International, Seabrook, N.H., and X-4107 from B.F. Goodrich Co., Cleveland, Ohio.

Useful polyolefin polymers that may be bonded to the bonding composition include copolymers of ethylene, propylene, and the like with, for example, acrylic monomers. Such copolymers may be prepared by conventional free radical polymerization or catalysis of such ethylenically unsaturated monomers. The degree of crystallinity of the polymer may vary. Carboxyl functionalities may be incorporated into the polymer by polymerizing or copolymerizing functional monomers such as acrylic acid or by modifying the polymer after polymerization, e.g., by grafting, by oxidation, or by forming ionomers. Examples include acid modified ethylene as well as ethylene-alkylacrylate copolymers. Such polymers and copolymers generally are commercially available, for example, as ENGAGE (Dow-DuPont Elastomers, Wilmington, Del.) or EXACT (ExxonMobil, Linden, N.J.). An example of an ethylene-methylacrylate copolymer is EMAC (Chevron Chemical Co., Houston, Tex.).

Useful polyacrylates and polymethacrylates that may be bonded to the bonding composition include polymers of acrylic acid, methyl acrylate, ethyl acrylate, acrylamide, methacrylic acid, methyl methacrylate, ethyl methacrylate, and the like.

Useful polycarbonate polymers that may be bonded to the bonding composition include aliphatic polycarbonates such as polyester carbonates, polyether carbonates, and bisphenol A derived polycarbonates, and the like.

Useful polyimide polymers that may be bonded to the bonding composition include polyimide polymers made from the anhydride of pyromellitic acid and 4,4'-diaminodiphenyl ether available from E.I. DuPont de Nemours and Company under the tradename KAPTON. Variations include KAPTON H, KAPTON E and KAPTON V, among others.

Useful commercially available elastomers that may be bonded to the bonding composition include NIPOL 1052 NBR (Zeon Chemical, Louisville, Ky.), HYDRIN C2000 epichlorohydrin-ethylene oxide rubber (Zeon Chemical, Louisville, Ky.), HYPALON 48 chlorosulfonated polyethylene rubber (E.I. DuPont de Nemours & Co., Wilmington, Del.), VAMAC ethylene-acrylate elastomer (E.I. DuPont de Nemours & Co. Wilmington, Del.), KRYNAC NBR (Bayer Corp., Pittsburgh, Pa.) and PERBUNAN NBR/PVC blend (Bayer Corp., Pittsburgh, Pa.).

The bonding composition may be applied to a polymer surface by a process such as, for example, lamination, powder spray coating, dispersion (preferably non-aqueous) and preferably extrusion. Typically the bonding composition may exist as pellets that are extruded onto the substrate, or co-extruded with the substrate, to form a bonded layer.

The bonding composition and polymer surface may contact each other, for example, under pressure, and be heated to bond the layers. Heat is applied at a temperature and time suitable to form a bond. For example, the temperature may be between 50 and 300° C., between 100 and 250° C., between 125 and 225° C., or between 150 and 220° C.

In many cases, heat, pressure, or combinations thereof, may be desired during bonding. Suitable heat sources include, but are not limited to, ovens, heated rollers, heated presses, infrared radiation sources, hot air streams, flame, and the like. Suitable pressure sources are well known and include presses, nip rollers, and the like.

The invention will now be described further by way of the following examples.

EXPERIMENTAL

Dyneon THV500 is a terpolymer of TFE/HFP/VDF, having a melt temperature of 165° C.; HTE-1500 and HTE-1700 are terpolymers of hexafluoropropylene, teterafluoroethylene and ethylene; Dyneon PVDF 11010 is a copolymer of hexafluoropropylene and vinylidene fluoride having a melting point of 160° C.; all available from Dyneon, L.L.C. of Oakdale, Minn.

BYNEL 3101 is an acid modified ethylene-vinyl acetate copolymer available from DuPont, Wilmington, Del.

MORTHANE-PU is a polyurethane available from Morton International of Chicago, Ill.

ELVALOY PTW is a terpolymer of ethylene, butyl acrylate and glycidylmethacrylate commercially available from DuPont, Wilmington, Del.

EVA-9 (ATEVA 1070) and EVA-12 (ATEVA 1240A) are ethylene-vinyl acetate copolymers commercially available from AT Plastics, Brampton, Ontario, Canada.

ELVAX 3170 is an ethylene-vinyl acetate resin available from DuPont, Wilmington, Del.

ADMER® NF456A (MAPE) is a modified polyolefin commercially available from Mitsui Chemicals America Inc., Purchase, N.Y.

"DDDA" refers to 1,12-dodecanediamine available from Sigma-Aldrich, Milwaukee, Wis.

"Silane-1" refers to 3-aminopropyltriethoxysilane available from Sigma-Aldrich, Milwaukee, Wis.; also available as SILQUEST A-1100 (Witco Corp, Greenwich, Conn.)

"Silane-2" refers to 3-(2-aminoethyl)aminopropyltrimethoxysilane available from Sigma-Aldrich, Milwaukee, Wis. as 80% purity or 97% purity. All examples used the 97% purity except example 34 as stated; also available as SILQUEST A-1120 (Witco Corp, Greenwich, Conn.)

A-1120 DLC is a 70% A-1120 (3-(2-aminoethyl)-aminopropyltriethoxysilane) "dry" liquid concentrate on Microcel E diatomaceous earth powder (available from Natrochem, Savannah, Ga.).

"GCDPTS" refers to 3-(glycidoxypropyl)trimethoxysilane (98%) available from Sigma-Aldrich, Milwaukee, Wis. (from Dow Corning as Z-6040).

"IOTS" refers to isooctyltriethoxy silane available from Sigma-Aldrich, Milwaukee, Wis.

"N,N-dimethylsilane-1" refers to N,N-dimethyl-3-aminopropyltriethoxysilane available from Sigma-Aldrich, Milwaukee, Wis.

"LDPE" refers to low-density polyethylene available as Huntsman 1058 available from Huntsman, Derry, N.H.

Nylon-12 (L25A) and Nylon-12 (L16A) are available commercially from EMS-GRIVORY CH-7013 Domat/Ems, Switzerland AQUATHENE AQ120-000 is an ethylene-vinyl silane (2% by weight vinyl silane monomer) copolymer available from Equistar Chemicals LP, Houston, Tex.

VFEPX 6815G is a fluoropolymer available from Dyneon LLC, Oakdale, Minn.

FORTIFLEX B53-35H-100 is a "high density polyethylene" copolymer available from BP Solvay, Houston, Tex.

DRIERITE is a heat activated (250 to 320° C.) form of calcium sulfate having a powerful affinity for water while being inert to a wide variety of organic compounds and solvents. It is commercially available from W.A. Hammond Drierite Co., Xenia, Ohio.

Peel Strength Test Methods

Peel strength was used to determine the degree of bonding. For all examples except example 33-36 peel strength was determined in accordance with ASTM D-1876 (T-peel test). A SinTech 20 test machine (MTS Corporation, Eden Prairie, Minn.) was used with a 100 mm per minute crosshead speed. The peel strength was calculated as the average load measured during the peel test. The measured peel strengths are listed in Table 2. The peel strength results were obtained by pressing sheets against fluoropolymer sheets at 200° C. for 2 min, except for the peel results of nylon sheets which were obtained at 220° C. for 3 min.

In example 33-36 in order to test the peel strength a strip of the specimen to be tested, 0.5-inch (1.3 cm) wide and at least 1 inch (2.5 cm) in length, was prepared. Each layer was placed in an opposed clamp of an Instron Tensile Tester (model 5564) obtained from Instron Corporation, Canton, Mass. Peel strength was measured at a cross-head speed of 150 millimeters/minute as the average load for separation of the two layers. Reported peel strengths represent an average of at least four samples.

Differential Scanning Calorimetry

The specimens were prepared by loading and weighing the material into the TA Instruments Q1000 standard aluminum sample pans followed by analysis using the TA Instrument Q1000 (TA Instruments Inc., New Castle, Del.) in standard DSC mode. A linear heating rate of 10° C./min was applied and the specimens were subjected to a heat-cool-heat profile ranging from −90° C. to 200° C. Peak integrations were evaluated using the heat flow curve. Peak integration results are normalized for sample weight and reported in J/g.

The "heat-cool-heat" DSC sequence provides valuable information on the polymers. The first heating provides information relating to the sample's history, by virtue of any non-reversible sub-melting transitions, as these may be attributed to regions of metastable organization resulting from processing. The melting point for polymers is usually taken at the peak of the endotherm, and shows excellent reproducibility. (For small molecules the extrapolated "onset point" correlates very well with capillary melting points.) Upon cooling from temperatures well above the melting point, differences are seen between similar polymers, owing to reproducible supercooling behavior related to molecular weights. (Formation of a crosslinked polymer typically produces large changes.) As DSC cooling is relatively rapid, the polymer develops a wide distribution of metastable regions having lower heats of transition. (Heats of fusion or crystallization are proportional to areas—in Joules per gram, J/g—of deviations from the linearly extrapolated melted-polymer curve regions.) The result is that such areas from cooling (and second heating) are normally lower than those from the first heating, as is the case here.

The second heating, like the first, tends to produce equilibration among polymer sub-structures upon approach to the melting point. As a result there is little change in the melting point, unless the first heating is too high and causes decomposition. Thus, the reproducible melting points of otherwise identical polymers may show small increases with increasing molecular weight. To be meaningful, it is helpful if contaminants have been washed out of the samples, as was done here.

Test Method for Determining Cross-Linking by Gel Content

ASTM D2765-01 Note 2 ("Determination of Gel Content and Swell Ratio of Ethylene Plastics with the following variations: A jacketed Soxhlet apparatus corresponding in design to CG-1371, Chemglass Scientific Apparatus, Vineland, N.J. is used, with p-xylene (b.p. 138° C./Aldrich 99%) as solvent. The extraction temperature is held constant at 138° C. by the design of the apparatus. Antioxident is omitted, as it would immediately be washed away from the sample by the Soxhlet extraction.

Analytical Method for Determining Primary Amine

General Procedure:

An unreactive solvent or solvent mixture for the sample is chosen. The solvent must be capable of, at least, significant swelling of the polymer at an appropriate temperature. The solvent is dried thoroughly. The polymer samples are exposed to an excess of a tagged benzaldehyde in the solvent at a specific temperature for an effective period of time, thoroughly removing water. Excess reagent is removed by Soxhlet extraction or multiple precipitation while maintaining dry conditions. The recovered samples are analyzed for increased taggant content relative to appropriate blank samples. The increase is taken as a measure of free primary amine content. Obvious interferences, such as "activated methylene" groups capable of condensing with benzaldehydes under the intended conditions must be avoided, blocked or subtracted, as well understood by analytical chemists.

Specific Procedure for EVA:

For EVA-9, EVA-12, ASEV-9/0.3 and ASEV-12/0.3 methyl tertiary butyl ether (MTBE) at its boiling point, 55° C. caused very substantial swelling and thus this solvent was selected.

The formation of a "Schiff's Base" (imine) by the reaction of 4-(methylthio)benzaldehyde with a primary amine is an equilibrium reaction involving elimination of water. Review articles (Sprung, Chem. Rev. 1940, 26, 297 and Layer, Chem. Rev. 1963, 63, 489) and references cited therein fail to provide information on the position of equilibrium. Therefore, it was necessary to establish the analytical importance of stringent drying. For this purpose chemically inert 280° C. activated calcium sulfate (DRIERITE) is effective.

Each test was conducted with ten replicates. Ten accurately weighed 6 mg (approximate) disks of polymer were placed together in an 8 mL vial with PTFE-lined screw cap. To the vial was added 5.00 mL dry MTBE and (in some cases as indicated in Table 4) 0.100 mL 4-$CH_3SC_6H_4CHO$ (Aldrich, 95%). Additionally (as indicated in Table 4), 1.00 g. DRIERITE, capable of accepting 0.057 g. $H_2O$, was added. Each vial was maintained at 55° C. (±5°) for at least 15 hr., then was cooled and the contents filtered to recover the polymer. The polymer disks were then washed with 1 mL MTBE to remove adhering reagent, weighed to estimate swelling, and placed in a "micro" (12 mm outside diameter) Soxhlet thimble. For certain samples (noted in Table 4) the Soxhlet thimble had been dried at 130° (with the loss of 0.023 g, presumed to be water). The boiling flask of the "micro" Soxhlet apparatus contained 20.00 mL MTBE. In certain cases the flask also contained 5.00 g DRIERITE as noted in Table 4. The Soxhlet apparatus was fitted with a 1 meter air condenser to avoid moisture condensation, and topped by a DRIERITE drying tube. The solvent was refluxed by means of a steam bath, resulting in a fill/drain cycle about every 1.3 minutes. This was continued for at least 15 hours or at least about 700 cycles. The disks (or particles) were quickly removed from the thimbles and weighed to estimate swelling. The disks were then allowed to dry in air to an apparent constant weight. The disks (or particles totaling 5 to 6 mg) were individually weighed, and analyzed by means of an Antek 9000 VSA NS analyzer (Antek Instruments, Houston, Tex.) for total nitrogen and sulfur simultaneously. The +/− values for N and S in Table 4 indicate the standard deviation (σ) variability in different locations, sampled widely, for the punched samples as a result of incomplete silane mixing. The +/− values for the S/N ratios for each of the punched samples lie close to one another, such that the +/− values listed in Table 4 are for 3σ, and represent a 99.6% confidence interval. The values in parentheses in Table 4 represent incomplete aldehyde reaction as shown by improvement with longer reaction times.

Standards for the Antek instrument were prepared using sulfamethazine (LECO, St. Joseph, Mich., carbon=51.78%, hydrogen=5.07%, sulfur 11.52%, and nitrogen=20.13%), a NIST-traceable standard for organic elemental analysis. Portions of sulfamethazine were weighed to the nearest microgram and dissolved into OMNISOLV (EM Science) tetrahydrofuran (THF) at accurately known volume. A gas-tight microliter syringe was used to transfer measured volumes of these standard solutions into 6 mm diameter quartz open-capsules. These standard solutions were dried under a stream of nitrogen gas on a steam-heated hotplate (85 degrees C.). The capsules were queued and analyzed in the ANTEK analyzer. Quartz open-capsules were used to introduce samples because there is no commercial source for combustible capsules which have sufficiently low nitrogen content to be used for the lowest level nitrogen samples (ca. 0.1 mcg nitrogen). The instrument was configured with dual detectors in tandem to monitor nitrogen and sulfur simultaneously for each sample. Interferences for organic nitrogen using the ANTEK 9000VSA appear to be limited to contaminating material(s) that contain organic nitrogen; non-nitrogen containing organics (e.g. silicones) do not interfere. Organic nitrogen is freed from the sample matrix by pyrolysis/combustion with oxygen and converted to excited state nitrogen dioxide by reaction with ozone. The excited state nitrogen dioxide emits light (this process is chemiluminescence), which is detected in a flow cell by a photomultiplier. Sulfur is determined by conversion to sulfur dioxide, excitation with a UV lamp, and detection by the emitted fluorescence. The nitrogen detector is ahead of the sulfur detector in the flow path.

The data are consistent with at least four conclusions: 1) The untreated EVA resins have little nitrogen or sulfur, and neither is present at a level that interferes with the study described here; 2) The aminosilane-bearing polymer samples have nitrogen not present in the starting EVA polymers and the level of nitrogen present is only slightly diminished upon extraction with solvent (i.e. the nitrogen which is present is predominantly reacted onto the polymer); 3) The sulfur-to-nitrogen ratios observed for the aminosilane-bearing polymers reacted in this procedure indicate up to 47 percent of the nitrogen is present as a reactive primary amine. The MTBA is reacted and retained in a 1:2 elemental ratio with nitrogen even upon extended extraction with fresh solvent; 4) Starting EVA resins without aminosilane attachment do not retain MTBA under the same conditions. The results in Table 4 indicate the importance of the reaction conditions. Careful drying, use of a drying agent and lengthy reaction times are critical to get accurate results. Adequate time is best determined by experiment, when further increase in time provides no significantly larger uptake of the benzaldehyde.

Examples 1-33 and Comparative Examples A-H

Compositions of examples 1-33 and comparative examples A-H were prepared by mixing polymer resins and amino alkoxysilanes in desired ratios as recorded in Tables 1 and 2. The mixtures were compounded in a PLASTICORDER (an internal bowl mixer equipped with roller blades, available from C.W. Brabender Instruments, Inc., South Hackensack, N.J.) at 140-180° C. for 10 to 20 minutes at a mixing rate of 70-80 revolutions per minute (rpm). After mixing, a portion of the compounded material was pressed into a 0.20 mm thick film by pressing between TEFLON (DuPont, Wilmington, Del.) cloth at 200° C. in a Wabash heated hydraulic press (Wabash MPI, Wabash, Ind.) at approximately 30 Kpa pressure for approximately 30 seconds. The film was cut into 1.25 cm×5.08 cm coupons for subsequent conversion into peel test specimens, as are the material film(s) to be bonded.

Example 34 and Comparative Example I 39.52 g AQUATHENE AQ120-000 was mixed at 180° C. for five minutes in a Haake HBI System 90 mixer, available from Thermo Electron Corporation (Waltham, Mass.) and equipped with a 50 ml bowl. After the torque had stabilized, 0.48 g of silane-2 (80% purity) was added. The mixture was blended between 80-100 rpm and after five minutes the mixing was stopped and the material was removed from the bowl mixer.

This compounded material was pressed into plaques at 149° C. for one minute at a pressure of 2.3 Mpa in a Wabash heated hydraulic press. For testing as a bonding layer two procedures were followed. In the first procedure, referred to as thermal lamination, a 0.25 mm thick layer of THV 500 was pressed against the compounded material. A "slip" (a piece of TEFLON cloth intended to preclude bonding) had been inserted between the two layers at one end to create an approximately 2.5 cm "starter crack" (the non-bonded region produced by the "slip", intended to permit independent grasping of the layers by the testing apparatus) and the laminate was heated at 200° C. for one minute at 1.4 Mpa. In the other procedure, referred to as vacuum lamination, the THV 500 (0.25 mm thickness)/compounded material sandwich with a slip was set in a vacuum laminator (inner dimensions 38 cm×30 cm), available from Vacuum Laminating Technology Inc. (Fort Bragg, Calif.). The vacuum laminator was preheated to 160° C. and 185° C. in a Wabash heated hydraulic press. After the test specimen had been set in the vacuum laminator, a vacuum (5 mbar) was pulled on the vacuum laminator such that the silicone rubber bladder was tightly sealed on top of the test specimen. The vacuum lamination lasted for eight minutes and no external force besides that from the vacuum was applied to the test specimen. The thermal lamination at 200° C. resulted in a peel strength of 22 while the vacuum laminations resulted in peel strengths of 4 (160° C.) and 7 (185° C.) N/cm.

AQUATHENE, without the silane-2 addition, was tested for bonding to THV 500 under the thermal lamination conditions described above and the sample delaminated before it could be tested (Comparative Example I).

Example 35

An EVA (poly(ethylene-co-vinyl acetate)), purchased from Aldrich, with a vinyl acetate content of 33% by weight and a melt flow index of 43, was mixed in a Haake HBI System 90 mixer, available from Thermo Electron Corporation (Waltham, Mass.) and equipped with a 50 ml bowl, at 180° C. for five minutes, the weight of the EVA was 40 g. After the torque had stabilized, 0.20 g of silane-2 (80% purity), i.e. 0.50% silane by weight, was added. The mixture was blended between 80-100 rpm, after five minutes the mixing was stopped and the material was removed from the bowl mixer.

This compounded material was pressed into plaques at 149° C. for one minute at a pressure of 2.3 Mpa in a Wabash heated hydraulic press. For testing as a bonding layer a vacuum laminating procedure was followed. In this procedure, a THV coupon (0.05 mm thick)/compounded material coupon/0.061 mm thick PET film coupon (the latter a biaxially oriented film available from 3M) sandwich with 2.54 cm "slips" between all layers was set in a vacuum laminator (inner dimensions 38 cm×30 cm), available from Vacuum Laminating Technology Inc. The vacuum laminator was preheated to 160° C. (without pressure) in a Wabash heated hydraulic press. After the test specimen had been set in the vacuum laminator a vacuum (5 mbar) was pulled on the vacuum laminator such that the silicone rubber bladder was tightly sealed on top of the test specimen. The vacuum lamination lasted for eight minutes and 48 kPa external pressure was applied with the press for the last 5 minutes of the lamination cycle.

To test the peel strength a strip of the specimen to be tested, 0.5-inch (1.27 cm) wide and at least 1 inch (2.54 cm) in length (beyond the "slip") was prepared.

Each layer was placed in an opposed clamp of an Instron Tensile Tester (model 5564) obtained from Instron Corporation, Canton, Mass.

Peel strength was measured at a cross-head speed of 150 millimeters/minute as the average load for separation of the two layers. Reported peel strengths represent an average of at least four samples.

Example 36

Same as example 35 except 0.80 g silane-2 was used.

Example 37

In this example a composite tube was produced having three layers. The first layer was VFEPX 6815G, the tie layer was ELVAX 3170+1% by weight A-1120 DLC, and the third layer was FORTIFLEX B53-35H-100. It was prepared using a Guill model 523 (Guill Tool and Engineering Co., Inc., West Warwick, R.I.) three-layer in-line extrusion head, and equipped with a wedge ring (central aperture diameter of 0.72 inches (1.8 cm)), a die with an inner opening of 0.866 inches (2.20 cm) and a straight pin of outside diameter 0.642 inches (1.63 cm).

The second layer was extruded onto the first layer while it was still in the extrusion tooling. Subsequently, the third layer was coated onto the second layer, also within the extrusion head, such that when the tube exited the extrusion head, it had a VFEPX 6815G first layer, a tie layer of Elvax 3170+1% by weight A-120 DLC as the second layer, and a FORTIFLEX B53-35H-100 third layer. To form the first layer, VFEPX 6815G was extruded using a 1.5-inch (3.8 cm) single screw extruder available from Harrel, Inc. of East Norwalk, Conn. (Temp Profile: Zone 1=130° C., Zone 2=185° C., Zone 3=185° C., Zone 4=195° C.). The second layer was extruded onto the first layer while it was still within the extrusion head using a 1.0-inch (2.5 cm) single screw extruder available from Harrel, Inc. (Temp Profile: Zone 1=130° C., Zone 2=180° C., Zone 3=205° C.). Next the third layer was extruded onto the second layer while it was still within the extrusion head using a 2.0 inch (5.1 cm) single screw extruder available from Harrel, Inc. (Temp Profile: Zone 1=185° C., Zone 2=200° C., Zone 3=210° C.). The extrudate exited a tube die at a line speed of 20.3 feet/minute (fpm) (6.2 meters/minute) and was quenched using a vacuum water chamber. The resultant composite tube had a nominal inner diameter of 6 mm and a nominal outer diameter of 8 mm. The bond strength between the VFEPX 6815G and the tie layer was 38 N/cm in the tube sample.

The tie layer, Elvax 3170+1% by weight A-1120 DLC, was made by compounding using a Berstorff 25 mm twin screw co-rotating extruder (Berstorff GMBH, Hannover, Germany). The polymeric resin was added in Zone 1 of the extruder via a volumetric feeder, AccuRate (Whitewater, Wis.), at a rate of about 40 lbs/hr (18.2 kg/hr). The A-1120 DLC powder was added into Zone 7 of the extruder, an open port, using another volumetric feeder, AccuRate (Whitewater, Wis.), at a rate of about 0.4 lbs/hr (0.18 kg/hr). The feed rate of the AccuRate volumetric feeder was adjusted to result in a final loading of 1% by weight of the A1120-DLC. The speed of the twin screws was 310 rpm. The temperatures of the extruder were set at Zone 1—170° C., Zone 2—170° C., Zone 3—175° C., Zone 4—175° C., Zone 5—175° C., Zone 6—180° C., Zone 7—185° C., Zone 8—187° C., Zone 9—191° C., Zone 10—207° C. Zone 10 represented the die zone. The molten compounded polymer exited the strand die, was quenched using a water bath and was finally pelletized (sheared into pellets).

Peel strength measurements are determined as follows: A tube is slit about in half along its length prior to preparing the strip, than a nominal 0.5-inch (1.3 cm) wide strip of sample (at least 1 inch (2.54 cm) in length) to be tested is prepared. A "starter crack" (1.27 cm minimum length) is initiated and the peel measured in the length direction.

Each layer is placed in an opposed clamp of an Instron Tensile Tester (model 5564) obtained from Instron Corporation, Canton, Mass. Peel strength was measured at a crosshead speed of 150 millimeters/minute as the average load for separation of to the two layers.

Reported peel strengths represent an average of at least four samples.

Example 38

In this example a multilayered film was produced having two layers. The base layer was THV 500G, available from Dyneon, Oakdale, Minn. The cap layer was ATEVA EVA 1240A. The film was prepared using a 2½" single screw HPM extruder (Crompton Davis-Standard Killion, Pawcatuk, Conn.) and a 1¾" single screw Killion extruder (Crompton Davis-Standard Killion, Pawcatuk, Conn.) equipped with a 34" multi-manifold die.

The cap layer, tie-layer, was prepared by compounding the EVA polymer and silane-1 at a ratio of 99:1 wt. % loading. The compounding was done in a Haake 25 mm Rheocord co-rotating twin screw extruder, Model #5000 (Waltham, Mass.). The EVA and silane were pre-blended prior to extruding. The polymeric resin blend was added in zone 1 of the extruder using a gravity feeder. The speed of the twin screw was 90 rpm. The temperature profile of the extruder was set at Z1—170° C., Z2—180° C., Z3—190° C., Z4—200° C. The die zone was set at 210° C. The molten compounded polymer exited the strand die, was quenched using a water bath and was pelletized.

The fluorothermoplastic and tie-layer were dried in a UniDyne Conveying Drier and UniDyne Tray Drier, respectively. The temperatures were set on the extruder/die control panel. Base layer extruder profile Z1—240° C., Z2—250° C., Z3—260° C., Z4—270° C., Z5—275° C. and die set point was 275° C. Cap layer extruder profile set points were Z1—120° C., Z2—140° C. and Z3—160° C. The cap layer was extruded onto the base layer upon exiting the die. The extrudates exited the die at a line speed of 30 fpm and were quenched between two counter-rotating rolls. The resultant film composite had a total thickness of 50-60 mm. The peel strength between the fluorothermoplastic and tie-layer was in excess of 25 N/cm.

TABLE 1

Siloxy Formation Shown by Torque Changes

| Example | Silane reagent | Polymer resin | Temp. (° C.) | Initial Torque (lb inches) | Torque change | Temp. change (° C.) |
|---|---|---|---|---|---|---|
| EX1 | Silane-1 | Admer | 172 | 860 | +940 | 1 |
| EX2 | IOTS | Admer | 172 | 860 | +300 | 4 |
| EX3 | GCDPTS | Admer | 172 | 860 | +380 | 2 |
| EX4 | Silane-1 | Bynel3101 | 105 | 1065 | +800 | 0 |
| CE A | DDDA | Bynel3101 | 105 | 1065 | No change | 0 |
| EX5 | IOTS | Bynel3101 | 172 | 612 | +250 | 2 |
| EX6 | Silane-1 | EVA-9 | 170 | 411 | +60 | 0 |
| CE B | DDDA | EVA-9 | 170 | 411 | −20 | 0 |
| EX7 | NN-dimethyl silane-1 | EVA-9 | 170 | 411 | +30 | 0 |
| EX8 | Silane-1 | Nylon-12 | 190 | NM | +1000 | 0 |
| CE C | Dodecylamine | EVA-12 | 172 | 454 | −40 | 0 |
| CE D | Dodecylamine | EVA-9 | 171 | 612 | −26 | 0 |

NM = not measured

TABLE 2

Bonding Compositions and Peel Strengths

| Example | Bonding composition | Polymer/silane in bonding composition by weight | Fluoropolymer Substrate | Peel strength (N/cm) |
|---|---|---|---|---|
| CE E | LDPE/silane-2 | 99/1 | THV500 | 0 |
| CE F | LDPE/silane-2 | 99/1 | PVDF 11010 | 0 |
| EX 9 | EVA-9/silane-1 | 99/1 | THV500 | 8 |
| EX 10 | EVA-9/silane-2 | 99/1 | THV500 | 16 |
| EX 11 | EVA-9/silane-1 | 99/1 | HTE-1500 | >10 tore |
| EX 12 | EVA-9/silane-1 | 99.5/0.5 | THV500 | 8 |
| EX 13 | EVA-9/silane-2 | 99.75/0.25 | THV500 | 19.2 |
| EX 14 | EVA-9/silane-1/silane-2 | 99.5/0.25/0.25 | THV500 | >20 |
| EX 15 | EVA-12/silane-2 | 99/1 | THV500 | >25 |

TABLE 2-continued

Bonding Compositions and Peel Strengths

| Example | Bonding composition | Polymer/silane in bonding composition by weight | Fluoropolymer Substrate | Peel strength (N/cm) |
|---|---|---|---|---|
| EX 16 | EVA-12/silane-2 | 99/1 | HTE-1500 | 16 |
| EX 17 | EVA-12/silane-2 | 99/1 | PVDF 11010 | 6 |
| EX 18 | EVA-12/silane-2 | 99.75/0.25 | THV500 | 13.4 |
| EX 19 | EVA-12/silane-2 | 99/1 | HTE-1500 | 5.2 |
| EX 20 | MORTHANE-PU/silane-1 | 99.25/0.75 | THV500 | 4 |
| EX 21 | MORTHANE-PU/silane-1 | 99.25/0.75 | HTE-1500 | 3.5 |
| EX 22 | MORTHANE-PU/silane-2 | 99.25/0.75 | THV500 | 13 |
| EX 23 | MORTHANE-PU/silane-1 | 99.25/0.75 | HTE-1500 | >20 |
| EX 24 | BYNEL-3101/silane-2 | 99.5/0.5 | THV500 | 8 |
| EX 25 | BYNEL-3101/silane-2 | 99.5/0.5 | HTE-1500 | 9.1 |
| EX 26 | Nylon-12/silane-1 | 99.5/0.5 | THV500 | 14 |
| EX 27 | Nylon-12/silane-1 | 99/1 | THV500 | 15.8 |
| EX 28 | Nylon-12/silane-2 | 99.5/0.5 | THV500 | >14 ripped |
| EX 29 | Nylon-12/silane-2 | 99/1 | THV500 | >18 ripped |
| EX 30 | ELVALOY/silane-1 | 99/1 | THV500 | >25 |
| EX 31 | ELVALOY/silane-1 | 99/1 | PVDF 11010 | >25 |
| EX 32 | ELVALOY/silane-1 | 99/1 | HTE-1700 | >25 |
| EX 33 | EVA-12/silane-2 | 90/10 | THV500 | 4.3 |
| EX 34 | AQUATHENE/silane-2 | 99/1 | THV500 | 22 (thermal lamination) |
| EX 35 | poly(ethylene-co-vinyl acetate/silane-2 | 99.5/0.5 | PET | 14 |
| EX 36 | poly(ethylene-co-vinyl acetate/silane-2 | 98/2 | PET | 19 |
| EX 37 | ELVAX 3170/A-1120 DLC | 99/1 | VFEPX 6815G | 38 |
| EX 38 | ATEVA EVA 1240A/silane-1 | 99/1 | THV500 | >25 |
| CE G | BYNEL 3101/IOTS | 99/1 | THV500 | 0 |
| CE H | ADMER/IOTS | 99/1 | THV500 | 0 |
| CE I | AQUATHENE | 99/1 | THV500 | 0 (thermal lamination) |

Example 39

In order to study the nature of the reaction between the aminosilane and the polymer with polar functionalities which yields the bonding composition of the current invention a series of extraction and bonding experiments were performed. These show that the mix is not just a blend but is a new polymer. The alkoxy groups of the silane are lost (evaporated) and the polymer is attached to the aminosilane by Si—O—C bonding. In the case of an ethoxysilane reacted with EVA it would be expected that ethyl acetate is evolved while with EVOH ethanol would be evolved. While it could be argued that any amino functional polymer might be directly bondable, a significant advantage of the present invention is the ability to convert readily available polymers in-situ into new amino functional analogs retaining the valuable properties of the starting polymers but also allowing bonding to difficult-to-bond substrates such as THV and ETFE fluoropolymers.

Examples of such a new amine-bearing polymer, aminoalkyl-silylated ethylene-vinyl acetate (ASEV) were made by thermally reacting ("compounding") ethylene-vinyl acetate copolymers with aminoalkyltrialkoxysilanes. In this reaction, believed to be catalyzed by the amino groups, some or all of the alkoxy groups were displaced with formation of siloxy bonds to the polymer chains. By thus bridging two chains an increase of molecular weight occurs, which would result in crosslinking if too high a level of silane were used. It is understood that limitations on mixing velocity during thermal reaction can result in local variations in growth of molecular weight within a polymer sample; this may be controlled and minimized by process improvements.

Two samples of ASEV, namely ASEV-9/0.3 and ASEV-12/0.3 were chosen for swelling/extraction studies. These were derived respectively from commercial EVA-9 and EVA-12 (dried carefully to eliminate moisture that would tend to produce interfering siloxane formations) by thermal reaction ("compounding") with 0.30% by weight of SILQUEST A-1120 $H_2N(CH_2)_2NH(CH_2)_3Si(OCH_3)_3$, moisture being excluded.

Comparative swelling/extraction studies were performed on the EVA-9 and EVA-12, and on ASEV-9/0.3 and ASEV-12/0.3. In the latter nomenclature the 9 & 12 designate the weight % of vinyl acetate in the copolymers while the 0.3 specifies the aminosilane level as added to the polymer. Typically there are extractable materials in polymers, as is shown here. It is intended by such extractions that any free aminosilanes be completely removed from the ASEV polymers, lest they contaminate the interface and confuse the interpretation of later successful thermal bonding to fluoropolymers. It is intended to demonstrate that such bondability is inherent in these novel ASEV polymers and is not the result of a free bonding agent migrating to the interface.

Two Soxhlet extractions were set up to run simultaneously on a 4-min cycle for 100 hr., each using ca. 150 mL fresh OMNISOLV (EM Science, Gibbstown, N.J.) methyl tert-butyl ether (MTBE), b.p. 55.2°. The MTBE had been freshly passed through a column of WOELM (M. Woelm, Eschwege, Germany) neutral alumina. The extraction thimbles had been dried at 130° and were provided with cut-off "cap" thimbles containing 5 g. of freshly-reactivated (at 320°) DRIERITE to assure no moisture could reach the samples. The reflux condensers bore drying tubes with DRIERITE. Silicone grease was rigorously excluded.

In one thimble was placed 10.00 g. of ASEV-9/0.3, in the other 10.00 g. ASEV-12/0.3, as multiple coupons of about 40 mils thickness. At the end of 100 hrs. (ca. 1500 cycles) upon immediate weighing at 27° C. the MTBE-swollen ASEV-9/0.3E coupons weighed 13.00 g. and the ASEV-12/0.3E weighed 13.20 g. This weight gain verified that all portions of the coupons were accessible for extraction of free constituents. "E" designates "cleansed by extraction".

The coupons were placed in weighing containers that were exposed to flowing dry nitrogen inside a tube that protected them from any access by air or moisture. After about. 50 hr the weights were: ASEV-9/0.3E, 9.814 g., ASEV-12/0.3E, 9.448 g. After 200+ hr. the weights were: ASEV-9/0.3E, 9.772 g., ASEV-12/0.3E, 9.427 g. The drying is virtually complete. Extractables are 2.3% by weight of ASEV-9/0.3 and 5.7% of ASEV-12/0.3.

A similar extraction procedure was performed upon beads of EVA-9 and EVA-12; the fresh "Omnisolv" MTBE was not further dried with alumina, and cap-thimbles were omitted, as no components were moisture-sensitive. At the end of 100 hrs (ca. 1500 cycles) the EVA-9E weighed 14.35 g., the EVA-12E 15.12 g. at 27°. After 50 hr. the weights were: EVA-9E 9.714 g., EVA-12E 9.584 g. After 200 hr. the weights were: EVA-9E 9.608 g., EVA-12E 9.437 g. Extractables are 4.0% of EVA-9 and 5.8% of EVA-12.

An obvious difference exists between the ASEV samples and their corresponding EVA "parent" polymers with regard to swelling by MTBE. The lower swellability is a direct result of growth of molecular weight due to siloxy bridging, and is proof that the silane is internalized, as mere surface silane could not so modify the swelling.

There is no observed difference between ASEV-12/0.3E, EVA-12, and EVA-12E in mechanical properties and the polymer does not become significantly harder on reaction with aminosilane as judged by Shore D hardness. All are 32±1 at 25° C.

The ASEV-12/0.3E sample was tested for cross-linking by gel content per the modified ASTM D2765-01 as described under EXPERIMENTAL. For this specific sample, the following procedure and modifications were used: The material was not ground. No antioxidant was added. The sample was carefully weighed (0.10128 g) and placed in a 12 mm OD×50 mm long thimble in a jacketed "micro" Soxhlet specially constructed in-house but corresponding in design to CG-1371, Chemglass Scientific Apparatus, Vineland, N.J. The Soxhlet was run for 17 hours at 1.7 minutes per fill/drain cycle (600 fill/drain cycles total). The porosity of the thimble was less than that of the ASTM D2765-01 Note 2 thimble and thus even more retentive of gel than the ASTM test. The residual product was dried in a stream of dry nitrogen gas to constant weight of 0.00136 g which corresponds to a gel content no greater than 1.34% by weight. While significant cross-linking is here considered to be greater than 10% gel content, typically the gel content should be below 5% and more typically below 2% by weight.

To further verify that these new ASEV polymers do contain aminoalkyl silane throughout their bulk, i.e., internalized, rather than being a mere surface attachment along with some other (unspecified) bridging, X-ray fluorescence (XRF) elemental analyses were performed, with the results (counts per sec.): ASEV-9/0.3E 2200, ASEV-12/0.3E 3000, EVA-9E 160, EVA-12E 230. The greater-than-tenfold increase in silicon despite the low (0.30 wt %) reactant level signifies internalized, not surface, silicon.

In order to distinguish between aminoalkyl silane and adventitious silica ($SiO_2$) and silicates, $^{29}Si$ MAS-NMR (Magic Angle Spinning NMR) was utilized. This technique detects characteristic NMR signals in solid polymers that are rigid on the NMR time scale. The very low level of silane required data collection for an entire weekend to bring the signal for "T-type" silane ($RSiO_3$) in ASEV-9/0.3E conclusively above "noise". $SiO_2$ and silicates cannot give this signal. The presence of bound (reacted) aminoalkyl silane is proved. In similar fashion the presence of "D-type" ($RR'SiO_2$) or "M-type" ($RR'R''SiO$) silane structures, from internalizing $RR'SiY_2$ or $RR'R''SiY$ respectively, can be detected and distinguished from "T-type" structures and from adventitious silicates and silica. T-type and D-type silanes are preferred. T-type are most preferred.

Time-of-Flight Secondary Ion Mass Spectroscopic analyses of the surfaces of EVA-12 and ASEV-12/0.3E fails to detect any aminoalkyl silane at the surface of the latter. It is not sensitive to components at the 0.3% level. The speculation that bonding to fluoropolymers is due to the migration of aminoalkyl silane to the surface is thus invalid.

The thoroughly-cleansed ASEV-9/0.3E and 12/0.3E coupons were provided for testing for thermal bonding to fluoropolymers. After extraction the bonding of ASEV-12/0.3 to THV-500 yielded a range of peel strengths of 10.5 to 11.2 lb-inches (1.2 N-m to 1.3 N-m) when tested several times. Likewise the bonding of ASEV-9/0.3 to THV500 yielded a range of peel strengths of 5 to 8 lb-inches (0.6 N-m to 0.9 N-m). This demonstrates that a polymer with internalized aminosilane is inherently bondable to fluorinated polymers and indicates that the higher the amine content the better the bonding.

EVA-9E, ASEV-9/0.3E, EVA-12E and ASEV-12/0.3E were submitted for differential scanning calorimetry (DSC) to determine whether DSC shows differences indicative of crosslinking. The samples were prepared and tested according to the procedure under DIFFERENTIAL SCANNING CALORIMETRY. The DSC results are shown in Table 3.

A detailed examination of the DSC results reveals that the ASEV samples have slightly higher melting points and higher heats of fusion than the precursor EVA samples. Crosslinked polymers are well known to have lower heats of fusion than their precursors, owing to the restriction of some of the alignment necessary for crystallization. Here the varied increase in molecular weights caused by random bridging by —O—Si—O— (and perhaps —O—Si—O—Si—O—) units actually slightly increases the tendency and capability for alignment, and thus heat of fusion and melting point.

The same effect is seen upon supercooling, where the ASEV samples begin to crystallize at significantly higher temperatures and exhibit higher heats of crystallization than their EVA precursors. This strongly indicates a greater alignment ability, rather than less as would occur if the ASEV samples were crosslinked and thus not free to align as completely.

Non-reversible pre-melting endotherms in the first heatings are located at about 84 C and 46 C for all samples, and are attributable to freezing-in of metastable chain arrangements formed respectively during Soxhlet extraction (at 55 C) by, and during evaporation (at 25 C) of, the methyl t-butyl ether swellant.

Glass transition temperatures, measured traditionally at the midpoint of the shift in heat capacity (H), do not differ significantly, being all about –30 C. Crosslinked polymers typically have higher glass transition temperatures than their precursors or analogs.

The DSC results verify that the ASEV species are not crosslinked polymers.

TABLE 3

Differential Scanning Calorimetry Data for Example 39

| Sample | 1st heat max °C. | 1st heat area J/g | 1st heat metastable endotherm location °C. | Cooling max °C. | Cooling area J/g | Cooling Midpoint Tg °C. | 2nd heat max °C. | 2nd heat area J/g | 2nd heat Midpoint Tg °C. |
|---|---|---|---|---|---|---|---|---|---|
| EVA-9E | 95.4 | −112 | 46.0, 83.6 | 81.1 | 101.6 | −31.0 | 95.7 | −105 | −31.8 |
| ASEV-12/.3E | 95.7 | −113 | 45.5, 84.0 | 83.2 | 105.1 | −30.2 | 96.7 | −104 | −31.7 |
| EVA-12E | 95.0 | −112 | 47.1, 84.4 | 82.5 | 102.3 | −31.2 | 96.5 | −103 | −32.8 |
| ASEV-9/.3E | 99.8 | −114 | 46.5, 83.1 | 87.5 | 115.0 | −30.3 | 100.5 | −112 | −31.3 |

TABLE 4

Primary Amine Determination from Example 39

| Sample | Description | Average mceq nitrogen/ gram polymer ± σ | Average mceq sulfur/ gram polymer ± σ | Average S/N ratio (NA = not applicable) ± 3σ | Average meq primary amine/ 100 g polymer | % vinyl acetate w/w in copolymer (H NMR $C_7D_8$/70° C.) |
|---|---|---|---|---|---|---|
| EVA-9 | No silane. Aldehyde treated 83 hrs. DRIERITE added to Soxhlet MTBE. | 0.1 +/− 0.1 | 0.3 +/− 0.3 | NA | NA | 9.0 |
| EVA-12 | No silane. Aldehyde treated 25 hrs. DRIERITE added to Soxhlet MTBE. | 0.1 +/− 0.1 | 0.2 +/− 0.3 | NA | NA | 11.7 |
| ASEV-9/.3 | Silane, no aldehyde, not extracted | 41.1 +/− 3.0 | 0.1 +/− 0.3 | 0.00 | NA | 8.9 |
| ASEV-12/.3 | Silane, no aldehyde, not extracted | 62.1 +/− 3.7 | 0.2 +/− 0.3 | 0.00 | NA | 11.4 |
| ASEV-12/.3E | Silane, no aldehyde, extracted | 50.5 +/− 3.5 | 0.2 +/− 0.3 | 0.00 | NA | 11.1 |
| ASEV-9/.3E | Silane, no aldehyde, extracted | 37.9 +/− 2.8 | 0.3 +/− 0.3 | 0.01 | NA | 9.0 |
| ASEV-12/.3E | No DRIERITE in rxn vial or Soxhlet MTBE. 70 hrs aldehyde rxn | 61.5 +/− 4.4 | 9.0 +/− 1.6 | 0.15 +/− 0.02 | (0.9) | NA |
| ASEV-9/.3E | No DRIERITE in rxn vial or Soxhlet MTBE. 48 hrs aldehyde rxn | 39.1 +/− 4.6 | 4.8 +/− 1.9 | 0.14 +/− 0.05 | (0.5) | NA |
| ASEV-9/.3E | DRIERITE added to rxn vial and Soxhlet MTBE. Thimble not dried. 22 hrs aldehyde rxn | 37.2 +/− 1.9 | 15.8 +/− 2.1 | 0.44 +/− 0.03 | 1.6 | NA |
| ASEV-12/.3E | DRIERITE added to rxn vial and Soxhlet MTBE. Thimble not dried. 22 hrs aldehyde rxn | 55.5 +/− 5.2 | 20.1 +/− 4.7 | 0.36 +/− 0.16 | (2.0) | NA |
| ASEV-12/.3E | DRIERITE added to rxn vial and Soxhlet MTBE and thimble dried. 28 hrs aldehyde rxn | 50.6 +/− 1.8 | 23.6 +/− 1.7 | 0.47 +/− 0.03 | 2.4 | NA |
| ASEV-9/.3E | DRIERITE added to rxn vial and Soxhlet MTBE and thimble dried. 16 hrs aldehyde rxn | 37.1 +/− 3.2 | 13.0 +/− 3.2 | 0.35 +/− 0.06 | (1.3) | NA |
| ASEV-9/.3E | DRIERITE added to rxn vial and Soxhlet MTBE and thimble dried. 62 hrs aldehyde rxn | 37.1 +/− 2.8 | 14.5 +/− 2.9 | 0.43 +/− 0.05 | 1.5 | NA |

Other embodiments are within the scope of the following claims.

We claim:

1. A multilayer bonded article comprising a bonding composition bonded to a second polymer, wherein the bonding composition comprises the reaction product of an amino substituted organosilane ester or ester equivalent and a first polymer that has a plurality of polar functionalities combinatively reactive with the silane ester or ester equivalent to displace the ester or ester equivalent groups, wherein the first polymer is covalently bonded to the silane via the silicon atom; and wherein the second polymer is selected from the group consisting of THV, HTE, PVDF, ETFE and combinations thereof.

* * * * *

UNITED STATES PATENT AND TRADEMARK OFFICE
CERTIFICATE OF CORRECTION

PATENT NO. : 7,745,545 B2  
APPLICATION NO. : 11/854233  
DATED : June 29, 2010  
INVENTOR(S) : Naiyong Jing Page 1 of 1

It is certified that error appears in the above-identified patent and that said Letters Patent is hereby corrected as shown below:

Column 1  
Line 6, after "divisional of" delete "pending".

Line 11, after "abandoned," delete "now pending,".

Column 5  
Line 62 (approx.), after " 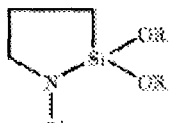 " insert -- . --.

Column 13  
Line 62, delete "sulfur 11.52%," and insert -- sulfur = 11.52%, --, therefor.

Column 16  
Line 33, delete "A-120" and insert -- A-1120 --, therefor.

Signed and Sealed this  
Twentieth Day of December, 2011

David J. Kappos  
*Director of the United States Patent and Trademark Office*